United States Patent [19]

Johnson

[11] 3,850,471

[45] Nov. 26, 1974

[54] WEATHER PROTECTIVE SKIRT

[76] Inventor: Gail Vernon Johnson, 6934 Estrella Ave., Desert Hot Springs, Calif. 92240

[22] Filed: Dec. 26, 1973

[21] Appl. No.: 428,431

[52] U.S. Cl.............................. 296/23 MC, 49/475
[51] Int. Cl............................................. B60p 3/32
[58] Field of Search.......... 296/23 MC, 35 A, 84 M, 296/135; 160/104, 105; 280/150 R; 52/716, 717, 718; 248/205 A, 206 A; 49/475

[56] References Cited
UNITED STATES PATENTS

| | | | |
|---|---|---|---|
| 2,249,424 | 7/1941 | Hanington | 49/475 |
| 3,004,769 | 10/1961 | Turner | 280/150 R |
| 3,128,072 | 4/1964 | Shibata | 248/205 A |
| 3,749,147 | 7/1973 | Hess et al. | 160/105 |

FOREIGN PATENTS OR APPLICATIONS

| | | | |
|---|---|---|---|
| 729,163 | 7/1932 | France | 49/475 |

Primary Examiner—Robert G. Sheridan
Assistant Examiner—Ross Weaver
Attorney, Agent, or Firm—Fulwider Patton Rieber Lee & Utecht

[57] ABSTRACT

A weather protective skirt for sealing a space between a load unit carried on the open bed of a vehicle. The skirt consists of an elongated strip of weather resistant material carrying a strip of insulative material along one longitudinal edge and a magnetic strip along the opposite longitudinal edge. The edge carrying the insulative strip is permanently affixed around the periphery of the load unit adjacent the space to be sealed and the opposite edge is magnetically attached to the outer surfaces of the bed.

2 Claims, 4 Drawing Figures

PATENTED NOV 26 1974 3,850,471
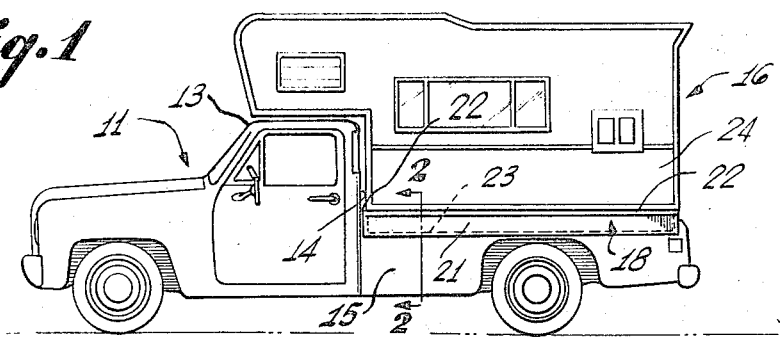
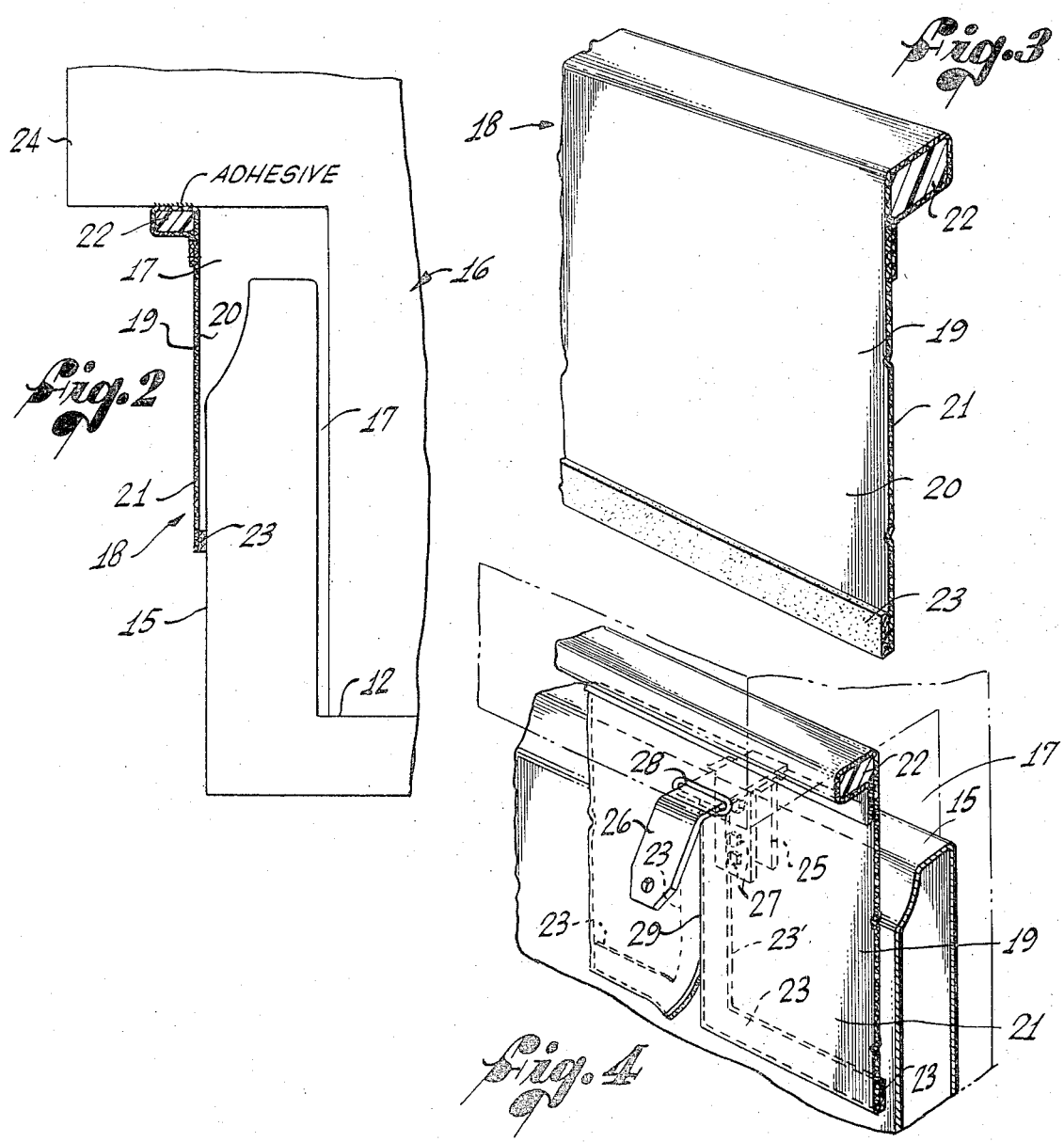

WEATHER PROTECTIVE SKIRT

BACKGROUND OF THE INVENTION

This invention relates to weather sealing for vehicles and more particularly to a weather protective skirt for sealing a space between an open bed of a vehicle and a load unit carried by the bed.

Open bed vehicles such as pickup trucks and the like are utilized as recreational vehicles, mobile offices and the like by the installation of a camper unit in the load bearing bed of the vehicle. A void or gap is purposely left between the side and forward wall of the bed and the camper unit to accommodate normal flex, body roll and side motion which occurs during movement of the vehicle. A gap is also left to provide tolerance for loading and unloading the camper unit.

The gap permits wind, rain, snow and other elements to contact the underside of the camper unit and the interior portions of the vehicle bed resulting in rot, staining and rusting of the camper unit and articles carried within the camper unit.

Likewise, other types of open bed vehicles are subject to having the load carried by the vehicle damaged even though the load is otherwise covered such as by a tarpaulin or the like. Normally, a peripheral gap is present, either intentionally or unintentionally, between the covering of the loads and the periphery of the bed of the vehicle through which rain, dust and the like can enter.

Various devices which have been suggested as a weather resistant sealing require a substantial modification of the vehicle to accommodate the sealing devices, such as by the installation of tie-downs, clamps or the like. Also such devices do not lend themselves to ready removal from the vehicle bed and removing or installing the sealing device is a time consuming operation.

Also, load flexing and shifting during operation of the vehicle often results in stressing the sealing device to the point where it is torn, thus requiring repair or replacement.

SUMMARY OF THE INVENTION

The present invention provides a sealing device which can be economically manufactured and is simple and easy to install without the necessity of substantial modification of the vehicle or special tools. The exterior appearance of the vehicle is preserved when the camper unit is unloaded, thus helping to maintain the resale value of the vehicle. The device of the invention is able to shift in response to a shifting of the load without reducing its effectiveness and without tearing thereby avoiding unnecessary repair or replacement.

As used herein the term "load unit" refers to a load carried on the open bed of a vehicle and includes items such as camper bodies and the like which require no additional covering for weather resistance or to loads such as bulk grain or other items which are normally covered by a tarpaulin or similar device.

The present invention relates to a weather protective skirt which extends between the side walls and forward wall of an open bed vehicle and a load unit carried on the vehicle to prevent the entrance therebetween of weather elements such as wind, rain, snow and the like. Although described hereinafter in connection with a recreation vehicle, it should be clear that the device of the present invention may be utilized to seal the peripheral edges of a tarpaulin or like covering to provide additional protection from the effects of rain, snow, dust and the like.

More specifically, the device of the present invention comprises an elongated flexible skirt of weather resistant material carrying on one longitudinal edge thereof a resilent strip of insulative material and carrying on the opposite longitudinal edge a magnetic element. The edge carrying the insulative strip is permanently mounted on the load or load covering material adjacent the space to be sealed, and the flexible weather resistant material extends between the load unit and the external peripheral wall surface of the vehicle for contact between the vehicle wall and the magnetic element carried by the flexible weather proof material. Openings may be provided in the flexible weather resistant material for the extension therethrough of hold downs which secure the load on the vehicle bed.

Other features and advantages of the present invention will become apparent from the following detailed description, taken in conjunction with the accompanying drawings, which illustrate, by way of example, the principles of the invention.

DESCRIPTION OF THE DRAWINGS

FIG. 1 is a side elevation of a vehicle and camper mounted thereon and showing the device of the present invention extending between the load and a side wall of the vehicle bed.

FIG. 2 is an enlarged cross sectional view taken in the direction of line 2—2 of FIG. 1.

FIG. 3 is an enlarged fragmentary perspective view, partially in section, of the device of the present invention.

FIG. 4 is an enlarged fragmentary view, partly in section, of the device of the present invention adapted for the extension therethrough of hold down clamps.

DESCRIPTION OF THE INVENTION

Referring to the drawings wherein like reference characters refer to like parts throughout the several figures, a vehicle 11 of the pickup type is shown having a bed 12 and a cab 13. The peripheral walls of the bed 12 being defined by the rear wall 14 of cab 13 and side panels 15. A camper unit 16 is mounted on the bed 12 of the vehicle and a gap or space 17 exists between the camper unit 16 and the peripheral walls as defined by the wall 14 and the side panels 15 of the bed 12. In accordance with the present invention, a weather protective skirt, shown generally at 18, extends between the camper unit 16 and the periphery of the bed 12, including the forward wall of the camper unit 16 and the rear wall 14 of the cab 13 to provide a weather resistant seal between the camper unit 16 and the bed 12 of the vehicle 11.

As more specifically shown in FIGS. 2 and 3 the weather protective skirt 18 comprises an elongated flexible skirt 19 of material such as, for example, canvass having an interior face 20 and an exterior face 21. The skirt 19 is treated on at least the exterior face 21, by coating with plastic for example, to make the skirt 19 resistant to moisture and the accumulation of dust. The width of the skirt 19 is dependent upon the dimensions of the gap 17 to be sealed although in recreational vehicles of the type illustrated, a width of four to six inches is normally sufficient.

One longitudinal edge of the skirt 19 carries an insulative strip 22 of resilient insulative material such as, for example, foamed polyurethane. To protect the insulative strip 22 from the effects of rain, sunlight and the like, a portion of the longitudinal edge of the skirt 19 is folded around the insulative strip 22 with the interior face 20 contiguous with the insulative strip 22 so as to completely cover the strip 22.

A magnetic strip 23 is affixed adjacent to and running parallel with the opposite longitudinal edge of the skirt 19 for magnetic contact with the periphery of bed 12.

As is more specifically shown in FIG. 2, the edge of the skirt 19 carrying the insulative strip 22 is permanently attached to the camper unit 16 such as on the overhanging portion 24 of the camper unit 16 adjacent the side panel 15, FIG. 2. The opposite edge of the skirt 19 is magnetically held against the side panel 15 of the vehicle 11 thereby to seal the gap 17 extending longitudinally between the camper unit 16 and the bed 12 of the vehicle 11. Similarly the gap 17 extending transversely is sealed by securing the edge of the skirt 19 carrying the insulative strip 22 to the front wall of the camper unit 16 and magnetically securing the opposite edge to the rear wall 14 of the cab 13.

By provision of the magnetic seal, the edge of the skirt 19 is free to move responsive to the relative motion of the camper unit 16 and the bed 12 without breaking contact between the skirt 19 and the vehicle 11. In this way the skirt 19 cannot be torn which would otherwise be the case if the skirt 19 was inflexibly attached to the vehicle 11 and the camper unit 16. The camper unit 16 can be installed or removed from the vehicle without the necessity of a separate operation to detach the skirt 19 from the vehicle 11.

The weather protective skirt 18 is preferably applied in sections around the periphery of the camper unit 16 adjacent the gap 17 in sections so that the length of the strip 19 is dependent upon the length of the peripheral section to be sealed. It should be clear, however, that the weather protective skirt 18 may comprise a unitary strip which surrounds the periphery as a single unit rather than in sections although manufacture and initial installations are made somewhat more difficult.

In many cases the bed 12 of the vehicle 11 is provided with openings or brackets, not shown, as mounting fixtures for the insertion of stakes and these are utilized to mount brackets 25 each carrying an outwardly extending tie-down 26 for securing the camper unit 16 in the bed 12. In such a case the skirt 19 is adapted for the extension therethrough of the tie-down 26.

As is more specifically shown in FIG. 4, the tie-down 26 extends through the side panel 15 and is carried by the bracket 25, shown in broken line, which is inserted in a mounting bracket, not shown, provided on the floor of the bed 12 and secured therein by bolts 27. The skirt 19 is provided with an opening 28 which is aligned with the tie-down for extension therethrough. The opening 28 is reinforced around the edge thereof to resist wear of the skirt 19 caused by rubbing of the skirt 19 agsinst the tie-down 26. To aid in installation and removal of the weather protective skirt 18, a slit 29 is provided extending perpendicularly from the opening 28 to the longitudinal edge of the skirt 19 carrying the magnetic strip 23. Sections 23' of the magnetic strip 23 are provided on the opposing edges of the slit 29 for holding the edges in approximate relationship with each other.

I claim:

1. In combination with a vehicle having an open bed and carrying a camper body thereon, the circumference of the camper body being smaller than the circumference of the bed thereby to define a peripheral space between the camper body and the periphery of the bed, a weather protective skirt extending aound the camper body adjacent the peripheral space and extending to the exterior peripheral edge of the vehicle bed and removably attached thereto to provide a weatherproof seal between the vehicle and the camper, the weatherproof skirt comprising a flexible elongated skirt of material, at least the exterior face of which is water and water resistant, a strip of insulative material affixed to the flexible skirt and extending along a longitudinal edge thereof, the longitudinal edge carrying the insulative strip being permanently mounted on the camper body and a magnetic strip carried on the inner face of the flexible skirt adjacent the opposite longitudinal edge thereof and magnetically attached to the peripheral edge of the bed of the vehicle.

2. The combination of claim 1 wherein a plurality of tie-downs extend outwardly from the peripheral edge of the bed of the vehicle and the flexible skirt is provided with a plurality of openings aligned therewith for extension of the tie-down therethrough and a slit extending normally from the longitudinal edge carrying the magnetic strip to the opening thereby to aid in positioning the tie-down and the skirt opening, the inner face of the flexible skirt adjacent each side of the normally running slot being provided with a magnetic strip for removably magnetically fixing the edges of the flaps to the peripheral exterior of the vehicle bed.

* * * * *

(5/69)

CERTIFICATE OF CORRECTION

Patent No. 3,850,471  Dated Nov. 26, 1974

Inventor(s) Gail Vernon Johnson

It is certified that error appears in the above-identified patent and that said Letters Patent are hereby corrected as shown below:

Column 4, line 7 after "tie down" insert -- 26 --.

line 10, "agsinst" should be -- against --.

line 31, second word "water" should be -- weather --.

Signed and Sealed this second Day of September 1975

[SEAL]

Attest:

RUTH C. MASON
Attesting Officer

C. MARSHALL DANN
Commissioner of Patents and Trademarks